Jan. 12, 1932.  J. L. HALSTEAD  1,840,447
PIPE JOINT AND METHOD OF FORMING THE SAME
Filed Dec. 28, 1929
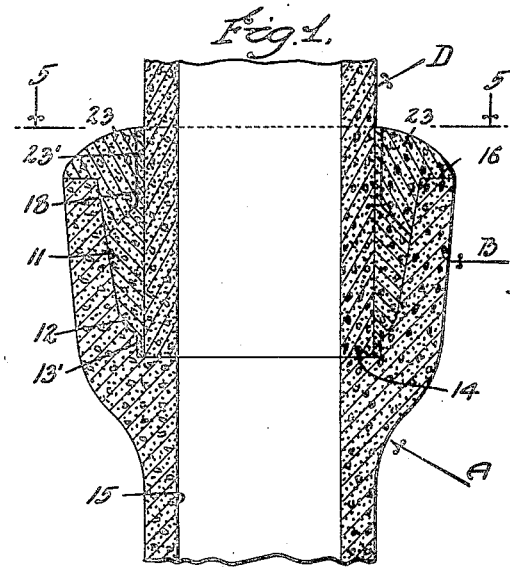
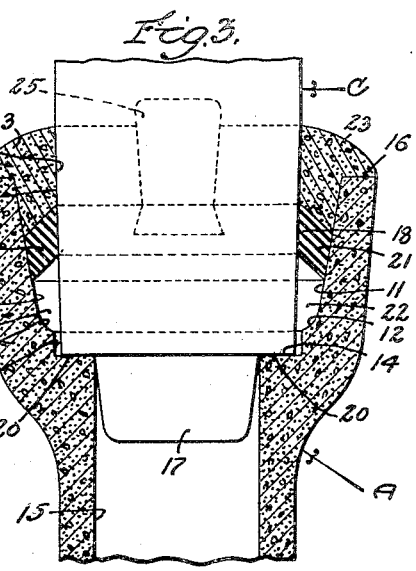
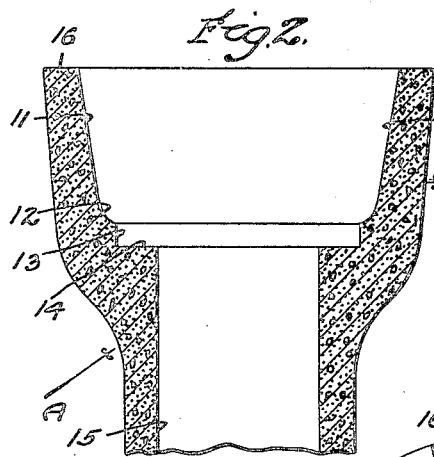
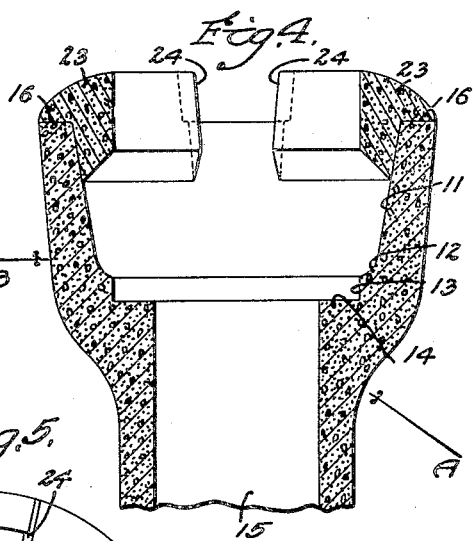
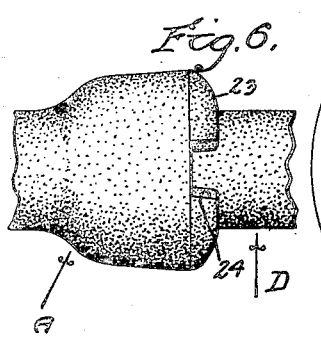
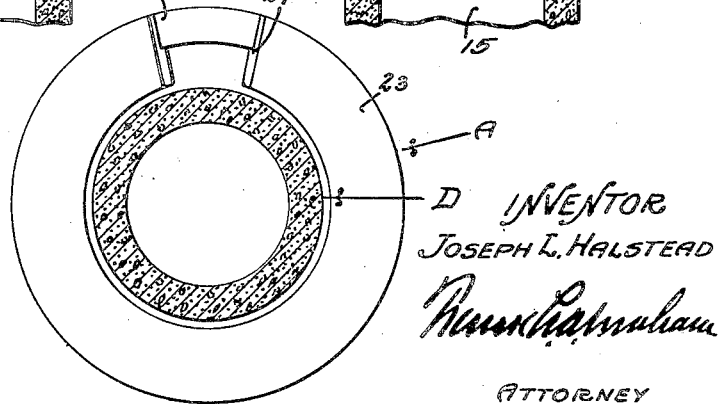
INVENTOR
JOSEPH L. HALSTEAD
ATTORNEY Patented Jan. 12, 1932

1,840,447

UNITED STATES PATENT OFFICE

JOSEPH L. HALSTEAD, OF LOS ANGELES, CALIFORNIA, ASSIGNOR TO AMERICAN CONCRETE PIPE COMPANY, A CORPORATION OF DELAWARE

PIPE JOINT AND METHOD OF FORMING THE SAME

Application filed December 28, 1929. Serial No. 417,222.

This invention relates to pipes and deals particularly with joints in precast pipes such as concrete or tile pipes and the method of forming the same. It is the purpose of this invention to provide an improved joint in pipes of the above character and to disclose a method for forming such joints.

In laying concrete pipe or the like having an ordinary belled end, it has developed in practice that a great deal of plastic material used in sealing such joints has been wasted due to the fact that the open end of the bell has no retaining means for preventing escape of the material. To prevent the waste of material various methods have been resorted to, such as packing the end of the bell around the spigot end of pipe, but in so far as I am aware there is no satisfactory method for preventing waste of plastic joining material in the type of joints commonly employed. This invention, in conjunction with other objects, provides a belled end for a pipe connection having means on the outer end for retaining the plastic joining material used in making a connection.

In practice, it has heretofore been found necessary to caulk joints to prevent leakage. This practice is expensive and laborious and can be obviated by the use of a mastic material for sealing connections. However, the utilization of a fluid or semi-fluid mastic material has been precluded by the use of an open-ended bell which does not provide means for preventing escape of the material. Accordingly, it becomes an object to provide a pipe section having a belled end and means on said belled end which, in conjunction with a spigot end of pipe, form an inner recess suitable for receiving and retaining a mastic sealing material.

The joint provided by this invention consists of an especially formed bell having a pipe aligning shoulder on the inner end of the bell and an inwardly extending shoulder on the outer end of the bell arranged to substantially engage the outer wall of a spigot end of pipe when inserted therein and to act as a retaining means to prevent escape of sealing material. Consequently, it becomes a further object of this invention to provide a joint having means for aligning continuous pipe sections.

By providing a bell which forms a working fit around a spigot end of pipe, I produce a joint that effectively prevents infiltration of roots or seepage waters. This is another feature of my invention.

In laying pipe having joints provided by this invention, a considerable saving in labor is effected by the arrangement of my joints whereby the sealing material is inserted through an opening provided in the top of the joints. This arrangement also eliminates waste in that the plastic sealing material is inserted at a single readily accessible point and is not permitted to flow out and around the exterior of the joint but is confined to an effective sealing space provided within the joint. It is obvious that under this arrangement, the time and material consumed in sealing such joints are appreciably reduced. Accordingly, it becomes a further object of this invention to provide joints wherein a labor saving and a saving of material in sealing said joints is effected.

In utilizing joints embodying my invention wherein the sealing material is inserted into a recess formed in the joint, it is clear that internal obstructions caused by bulging masses of sealing material obtruding into the pipe passage at the abutting ends of the pipe are eliminated. Consequently, it is another object of this invention to provide a joint wherein the abutting ends of pipe form a smooth uninterrupted passage throughout the length of the pipe when laid in place.

The method involved in this invention comprises several distinct steps and is unique in the utilization of a mandrel and a rubber gasket used conjointly to form the inwardly extending flange on the bell.

Other objects and advantages will appear as the description proceeds in conjunction with the drawings in which Fig. 1 is a vertical center line section showing my joint completely assembled;

Fig. 2 illustrates a bell flange as it appears after the first step of my method;

Fig. 3 illustrates the method of forming the outer inwardly extending flange on the bell;

Fig. 4 shows a vertical section of the bell with the inwardly extending flange formed thereon;

Fig. 5 is a plan view taken on the line 5—5 of Fig. 1; and

Fig. 6 is a small view showing the joint assembled and laid ready for the insertion of the plastic sealing material.

More specifically describing the method of forming my joint, reference is made to Fig. 2. The view shown in Fig. 2 illustrates fragmentarily a section of pipe A having a bell B cast thereon. It will be noted that the inner wall 11 of the bell B flares outwardly and that the base of the wall 11 terminates in a curved shoulder 12 whereupon the wall extends downwardly in a straight run 13 which intersects with a squared shoulder 14 surrounding the opening 15 in the pipe A. From the foregoing, it is obvious that the bell provided varies only slightly from the conventional bell provided on ordinary pipe of this type, and it may be stated that my invention may utilize the conventionally formed bell to obtain some of the benefits sought in this invention. However, my joint departs from the conventional joint in that an inwardly extending flange is provided on the outer end of the bell B and a pipe aligning shoulder 12 is provided which serves to guide the spigot end of a pipe section into the straight walled section 13 which in conjunction with the inwardly extending flange on the outer end of the bell operates to align adjacent sections of pipe.

The method of forming the inwardly extending flange on the outer end 16 of the bell B consists of the following: A mandrel C having a centering plug 17 is inserted into the bell B, and the plug 17 in conjunction with the opening 15 operates to center the mandrel in the bell. Attention is called to the fact that the mandrel C is provided with slightly tapering sides 18 for the purpose of withdrawal, and that the sides 18 terminate in a shoulder 20 adapted to seat upon the shoulder 14. A compressible gasket 21, which preferably may be of rubber, is then packed between the side 18 of the mandrel C and the wall 11 in a manner to form a retaining wall therebetween. It is evident that this arrangement provides an annular space 22 below the gasket 21 and the shoulder 14, the purpose of which will become apparent in the following description. It is obvious that in place of a gasket retaining wall a space-filling removable or soluble core could be employed to block off the space 22.

After the gasket 21 has been forced into place, plastic material may then be poured or rammed into place to form a collar 23, substantially as shown by dotted lines in Fig. 3. When the collar 23 has sufficiently set, the mandrel C is withdrawn and the gasket 21, due to its flexibility, is readily removed. The result is a structure substantially as shown in Fig. 4. In large structures, when the collar 23 presents a heavy thickened structure, it is advisable to precast an opening 24 in the collar for the purpose of later inserting the plastic material to form the completed joint. For this purpose, I have equipped the mandrel C with an outwardly extending lug 25 arranged thereon to be readily withdrawn from the casting with the mandrel and leave the opening 24 as shown in Fig. 4. However, in small structures this is not necessary since the collar 23 may be readily chipped to permit a sufficient opening therethrough.

The structure as shown in Fig. 4 illustrates the type of bell contemplated by this invention. In forming joints under this arrangement, it becomes a comparatively simple process.

In Fig. 1, I have illustrated a formed joint which comprises the structure as shown in Fig. 4 in conjunction with a spigot end of pipe D. It will be noted that the pipe D seats upon the shoulder 14 and that the opening 25 within the pipe D substantially coincides with the opening 15 of the pipe A. This is brought about by the straight portion 13 which serves to force the end of the pipe D into proper alignment with the pipe A and in conjunction with the flange 23 also acts as a means of aligning adjacent joints. After the pipe D has been properly inserted, a suitable plastic material is forced through the opening 24, and being of a suitable nature it follows around the pipe D and fills the annular space 22, together with the smaller spaces 13' and 23' formed between the pipe D and the wall 13 and flange 23, respectively. A plastic material suitable for this purpose is characterized by having sufficient plasticity to perform the function of filling the spaces 22, 13', and 23', and sufficient adhesive properties to form a fluid-tight joint. However, my invention is not dependent on filling all the spaces 22, 13', and 23', but is to be considered as effective if sufficient material is forced into space 22 to form a suitable bond between the bell B and the pipe D.

It is evident in forming joints of this character that practically the only amount of material necessary is that required to fill the annular space surrounding the pipe D and that by means of proper equipment the material may be readily and accurately inserted through the opening 24 with considerable saving of time and material.

Although I have shown my joint as applied to a concrete structure, I am aware that the arrangement set forth may be adaptable for other uses, consequently, this disclosure is intended to include all applications and modifications of the structure, as well as of the method, that fall fairly within the scope of the specification and the purview of the appended claims.

I claim as my invention:

1. The method of forming an inwardly extending flange on a belled end of a concrete pipe section consisting in: placing a mandrel in an open-ended bell; forming a retaining wall between said mandrel and said bell near the open end of said bell; and applying cementitious mixture to form an inwardly extending flange above said retaining wall.

2. The method of forming an inner annular recess in a belled end of a concrete pipe section consisting in: blocking off the lower part of said bell with a mandrel and a retaining wall; and filling the upper part of said bell with cementitious material.

In testimony whereof, I have hereunto set my hand at Los Angeles, California, this 19th day of December, 1929.

JOSEPH L. HALSTEAD.